United States Patent
Yang et al.

(10) Patent No.: US 12,505,196 B2
(45) Date of Patent: Dec. 23, 2025

(54) DEVICE UNLOCKING METHOD AND ELECTRONIC DEVICE

(71) Applicant: ASUSTeK COMPUTER INC., Taipei (TW)

(72) Inventors: Chih-Hsien Yang, Taipei (TW); Hui-Fen Chen, Taipei (TW); I-Hsi Wu, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 219 days.

(21) Appl. No.: 18/314,756

(22) Filed: May 9, 2023

(65) Prior Publication Data
US 2024/0126861 A1   Apr. 18, 2024

(30) Foreign Application Priority Data
Oct. 14, 2022   (TW) .................................. 111139039

(51) Int. Cl.
*G06F 21/40* (2013.01)
*G06F 21/32* (2013.01)

(52) U.S. Cl.
CPC .............. *G06F 21/40* (2013.01); *G06F 21/32* (2013.01); *G06F 2221/2149* (2013.01)

(58) Field of Classification Search
CPC ................................. G06F 21/40; G06F 21/32
See application file for complete search history.

(56) References Cited

U.S. PATENT DOCUMENTS

| | | | |
|---|---|---|---|
| 10,380,398 B2 | 8/2019 | Jiang et al. | |
| 2018/0268121 A1* | 9/2018 | Zhou | G06F 21/32 |
| 2018/0330145 A1* | 11/2018 | Dai | G06F 21/32 |
| 2022/0262161 A1* | 8/2022 | Zhao | G06V 40/1388 |
| 2024/0073305 A1* | 2/2024 | Yu | G06F 1/1643 |

FOREIGN PATENT DOCUMENTS

| | | |
|---|---|---|
| CN | 106022072 | 3/2019 |
| CN | 113971271 | 1/2022 |
| CN | 114861152 | 8/2022 |

* cited by examiner

*Primary Examiner* — Clayton R Williams
(74) *Attorney, Agent, or Firm* — JCIPRNET

(57) ABSTRACT

A device unlocking method and an electronic device are provided. The method includes: detecting fingerprint information of a user by a first sensor of the electronic device; authenticating the fingerprint information and temporarily storing an authentication result of the fingerprint information; after authenticating the fingerprint information, detecting operation environment information related to the electronic device by a second sensor of the electronic device; and in response to the operation environment information meeting a default condition, unlocking the electronic device according to the authentication result.

9 Claims, 2 Drawing Sheets

DEVICE UNLOCKING METHOD AND ELECTRONIC DEVICE

CROSS-REFERENCE TO RELATED APPLICATION

This application claims the priority benefit of Taiwan application serial no. 111139039, filed on Oct. 14, 2022. The entirety of the above-mentioned patent application is hereby incorporated by reference herein and made a part of this specification.

BACKGROUND

Technical Field

The disclosure relates to a device unlocking method and an electronic device.

Description of Related Art

Most electronic devices such as smartphones or laptops support automatic locking of screens or devices. For example, after a period of inactivity, the electronic device automatically locks the screen and/or other input/output interfaces to prevent mistouch or theft. When the user intends to use the electronic device, the user may authenticate the identity of the operator through the fingerprint sensing technology provided by the electronic device. If the input fingerprint passes authentication, the electronic device may automatically unlock and return to normal use. However, an issue often encountered in practice is that when the user puts the smartphone in the pocket of his jacket or trousers, if the finger of the user inadvertently touches the fingerprint sensing interface of the smartphone, the smartphone may be accidentally unlocked.

SUMMARY

The disclosure provides a device unlocking method, which is used for an electronic device. The electronic device includes a first sensor and a second sensor. The device unlocking method includes the following steps. Fingerprint information of a user is detected by the first sensor. The fingerprint information is authenticated and an authentication result of the fingerprint information is temporarily stored. After authenticating the fingerprint information, operation environment information related to the electronic device is detected by the second sensor. In response to the operation environment information meeting a default condition, the electronic device is unlocked according to the authentication result.

The disclosure further provides an electronic device, which includes a first sensor, a second sensor, a buffer memory, and a processor. The processor is coupled to the first sensor, the second sensor, and the buffer memory. The processor is used to execute the following. Fingerprint information of a user is detected by the first sensor. The fingerprint information is authenticated and an authentication result of the fingerprint information is temporarily stored in the buffer memory. After authenticating the fingerprint information, operation environment information related to the electronic device is detected by the second sensor. In response to the operation environment information meeting a default condition, the electronic device is unlocked according to the authentication result.

DETAILED DESCRIPTION OF DISCLOSED EMBODIMENTS

Figure 1:
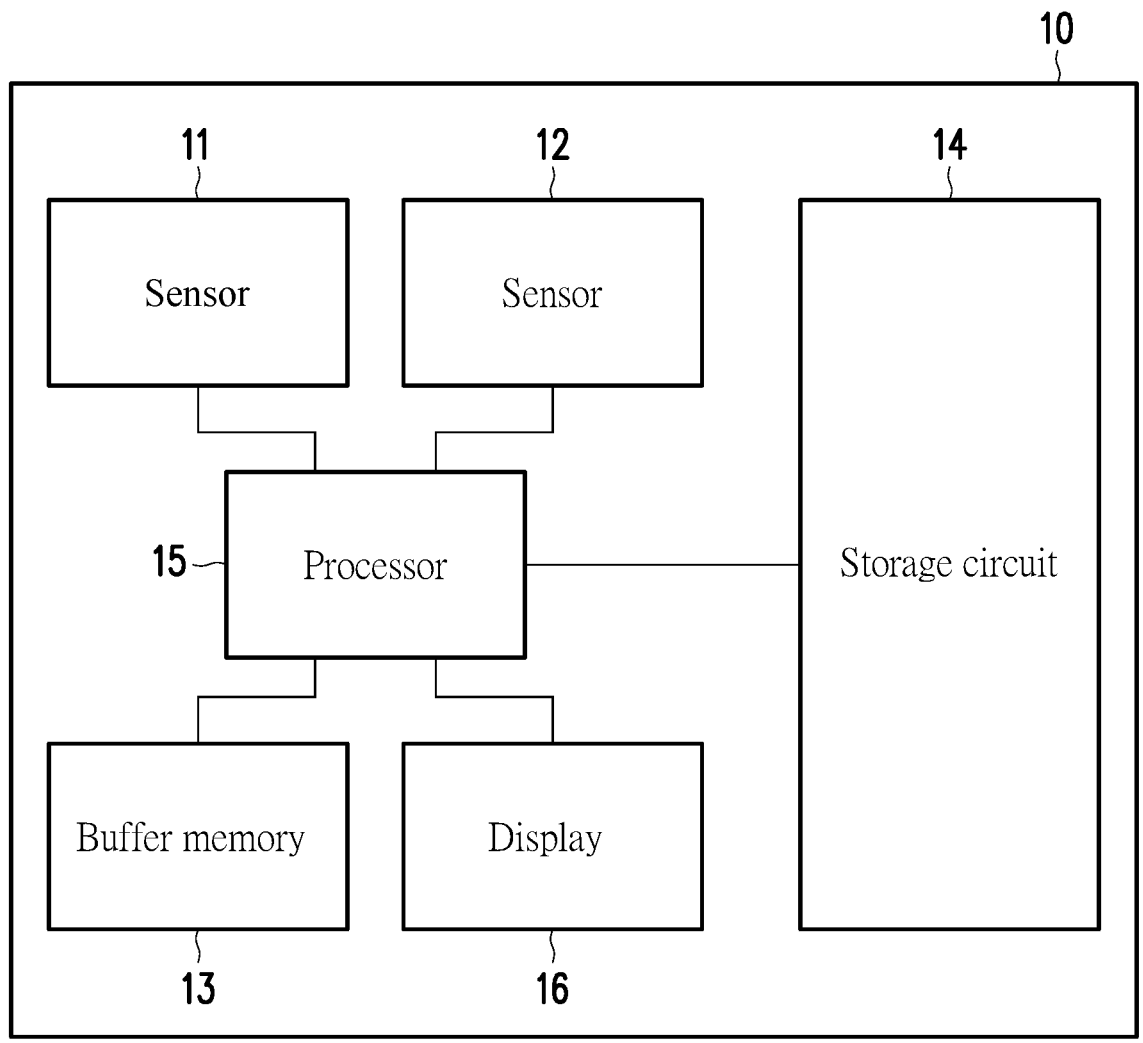
FIG. 1 is a schematic diagram of an electronic device according to an embodiment of the disclosure.

Please refer to FIG. 1. An electronic device 10 includes a sensor (also referred to as a first sensor) 11, a sensor (also referred to as a second sensor) 12, a buffer memory 13, a storage circuit 14, a processor 15, and a display 16.

The sensor 11 supports a fingerprint sensing function. For example, the sensor 11 may be used to detect fingerprint information of a user. For example, the fingerprint information may reflect fingerprint patterns of the user. For example, the sensor 11 may include an optical fingerprint sensor, an ultrasonic fingerprint sensor, or other types of fingerprint sensors, and the type of the sensor 11 is not limited thereto. In addition, the sensor 11 may be disposed at any position on the electronic device 10, such as on a power button, on a main control button (for example, a home button), combined with a screen of the electronic device 10, or at other positions, which is not limited in the disclosure. Persons skilled in the art should know how to design and configure the sensor 11 to have the fingerprint sensing function.

The sensor 12 may be used to detect operation environment information related to the electronic device 10. For example, the operation environment information may reflect at least one of a distance between the electronic device 10 and an external object or a screen state of the electronic device 10. For example, the sensor 12 may include a proximity sensor, an optical sensor, or other types of sensors or sensing circuits, and the type of the sensor 12 is not limited thereto. In addition, the sensor 12 may also include a sensor module implemented by software or firmware.

The buffer memory 13 is used to temporarily store data. For example, the buffer memory 13 may include a dynamic random access memory (DRAM) or other types of volatile memory modules. In an embodiment, the buffer memory 13 may also be implemented in a non-volatile memory module (for example, a flash memory module), which is not limited in the disclosure.

The storage circuit 14 is used to store data. For example, the storage circuit 14 may include a read only memory (ROM), a solid state disk (SSD), a conventional hard disk drive (HDD), a flash memory module, an embedded multimedia card (eMMC), a universal flash storage (UFS) device, or similar non-volatile storage media.

The processor 15 is coupled to the sensor 11, the sensor 12, the buffer memory 13, and the storage circuit 14. The processor 15 is responsible for the entire or partial operation of the electronic device 10. For example, the processor 15 may include a central processing unit (CPU) or other programmable general purpose or specific purpose microprocessors, digital signal processors (DSP), programmable controllers, application specific integrated circuits (ASIC), programmable logic devices (PLD), other similar devices, or a combination of these devices.

The display 16 is coupled to the processor 15 and is used to display an image. For example, the display 16 may include a plasma display, a liquid crystal display (LCD), a thin film transistor liquid crystal display (TFT-LCD), an organic light emitting diode (OLED), a light emitting diode (LED) display, etc., and the type of the display 16 is not limited thereto. In addition, the electronic device 10 may also include a power management circuit and various input/output devices, such as a network interface card, a mouse, a keyboard, a touch panel, a speaker, and/or a microphone, etc., and the type of the input/output device is not limited thereto.

At a timepoint, the electronic device 10 may be in one of a locked state and an unlocked state. In the locked state, the input/output device of the electronic device 10 only responds to a certain type of input information. For example, the specific type of input information may include identity authentication information for unlocking the device and dialing information for making an emergency call. Therefore, in the locked state, no matter how the user performs a button operation or a gesture operation on the electronic device 10, most functions of the electronic device 10 are locked and do not work. In addition, in the locked state, the display 16 of the electronic device 10 is often also in the locked state and may present a screen lock image (or a standby image).

In the locked state, the user may input the identity authentication information (for example, the fingerprint information) to try to unlock the electronic device 10. After passing identity authentication, the electronic device 10 may be switched from the locked state to the unlocked state. In the unlocked state, most of the functions of the electronic device 10 may be restored and respond normally according to the button operation and/or the gesture operation on the electronic device 10 by the user. For example, in the unlocked state, the user may input operation information through a touchpad, a touch screen, or various physical buttons of the electronic device 10 to instruct the electronic device 10 to execute a corresponding operation function, such as inputting a dialog message, executing a general call, or playing a specific video. In addition, in the unlocked state, the display 16 of the electronic device 10 is also in the unlocked state and may present a home page image or various application interfaces. For example, in the unlocked state, the user may operate graphics on the home page image or various application interfaces through a tap or swipe gesture to execute a specific operation function. In an embodiment, the unlocked state is also referred to as a normal operation state of the electronic device 10. It should be noted that from the above description, persons skilled in the art should know what the locked state and the unlocked state of the electronic device 10 are, and details are not repeated here.

Figure 2:
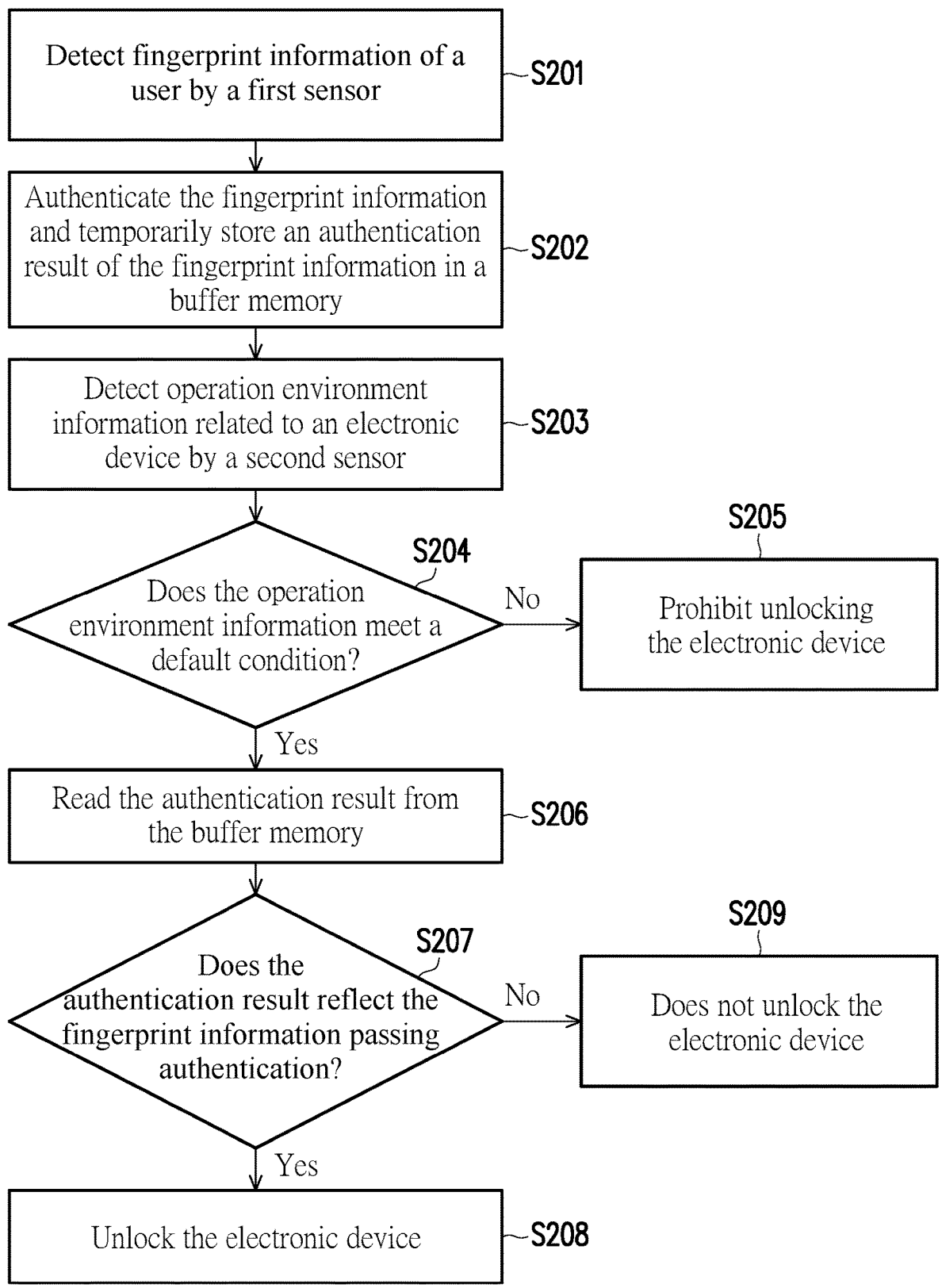
FIG. 2 is a flowchart of a device unlocking method according to the disclosure.

The following describes a device unlocking method according to an embodiment of the disclosure with the flowchart of FIG. 2 in conjunction with the electronic device 10 of FIG. 1. In particular, in the flowchart of FIG. 2, it is assumed that the electronic device 10 is currently in the locked state.

Please refer to FIG. 1 and FIG. 2. In Step S201, the processor 15 may detect the fingerprint information of the user by the sensor 11 (that is, the first sensor). For example, when a finger of the user touches or approaches a sensing surface of the sensor 11, the sensor 11 may generate a corresponding sensing signal according to the detected fingerprint. The processor 15 may receive the sensing signal from the sensor 11 and obtain the fingerprint information of the user according to the sensing signal.

In Step S202, the processor 15 may authenticate the obtained fingerprint information and temporarily store an authentication result of the fingerprint information. For example, the processor 15 may compare fingerprint patterns corresponding to the obtained fingerprint information with fingerprint patterns corresponding to a registered fingerprint in a database. The processor 15 may judge whether the obtained fingerprint information passes authentication according to a comparison result. For example, according to the comparison result, the processor 15 may judge whether a similarity between the fingerprint patterns corresponding to the obtained fingerprint information and the fingerprint patterns corresponding to the registered fingerprint in the database exceeds a default value. If the similarity between the fingerprint patterns corresponding to the obtained fingerprint information and the fingerprint patterns corresponding to the registered fingerprint in the database exceeds the default value, the processor 15 may judge that the obtained fingerprint information passes authentication. However, if the similarity between the fingerprint patterns corresponding to the obtained fingerprint information and the fingerprint patterns corresponding to the registered fingerprint in the database does not exceed the default value, the processor 15 may judge that the obtained fingerprint information does not pass authentication. Next, the processor 15 may store the authentication result of the fingerprint information in the buffer memory 13. In other words, the authentication result of the fingerprint information stored in the buffer memory 13 may reflect whether the fingerprint information passes authentication.

After authenticating the fingerprint information, in Step S203, the processor 15 may detect the operation environment information related to the electronic device 10 by the sensor 12 (that is, the second sensor). For example, the operation environment information may reflect at least one of the distance between the electronic device 10 and the external object or the screen state of the electronic device 10.

In Step S204, the processor 15 may judge whether the detected operation environment information meets a default condition. If (or in response to) the detected operation environment information does not meet the default condition, in Step S205, the processor 15 may prohibit unlocking the electronic device 10. In other words, no matter whether the authentication result of the fingerprint information currently stored in the buffer memory 13 presents whether the fingerprint information passes authentication, once Step S205 is entered, the electronic device 10 will not be unlocked until the operation environment information meets the default condition.

On the other hand, if (or in response to) the detected operation environment information meets the default condition, in Step S206, the processor 15 may read the authentication result of the fingerprint information from the buffer memory 13. In Step S207, the processor 15 may judge whether the fingerprint information passes authentication according to the authentication result. If (or in response to) the authentication result reflects that the fingerprint information passes authentication, in Step S208, the processor 15 may unlock the electronic device 10. For example, in Step S208, the processor 15 may switch the electronic device 10 from the locked state to the unlocked state. Alternatively, if (or in response to) the authentication result reflects that the fingerprint information does not pass authentication, in Step S209, the processor 15 may not unlock the electronic device 10. For example, in Step S209, the processor 15 may maintain the electronic device 10 in the locked state.

In an embodiment, the operation environment information may reflect the distance between the electronic device 10 and the external object. For example, the processor 15 may detect the distance between the electronic device 10 and the external object through the sensor 12 (for example, the proximity sensor or the optical sensor). If (or in response to)

the distance between the electronic device 10 and the external object is greater than a threshold value (for example, a sensing signal value of the sensor 12 exceeds a sensing threshold value), the processor 15 may judge that the currently detected operation environment information meets the default condition. However, if (or in response to) the distance between the electronic device 10 and the external object is not greater than the threshold value (for example, the sensing signal value of the sensor 12 does not exceed the sensing threshold value), the processor 15 may judge that the currently detected operation environment information does not meet the default condition. It should be noted that how to evaluate the distance between the electronic device 10 and the external object according to a sensing result of the proximity sensor, the optical sensor, or similar sensors is a common technical means in the technical field, and details are not repeated here.

In an embodiment, if the distance between the electronic device 10 and the external object is not greater than the threshold value, it means that the electronic device 10 may be placed in a jacket pocket, a trouser pocket, or a bag of the user at this time. In such situation, the finger of the user may mistouch the sensor 11 by sticking into the jacket pocket, the trouser pocket, or the bag. At this time, if the electronic device 10 is unlocked directly according to the fingerprint information detected by the sensor 11, it may cause the electronic device 10 to be unlocked unexpectedly, thereby causing the electronic device 10 to execute a malfunction. However, according to Steps S204 and S205 in FIG. 2, in the case where the distance between the electronic device 10 and the external object is not greater than the threshold value (that is, the operation environment information does not meet the default condition), the processor 15 may prohibit unlocking the electronic device 10. In this way, the electronic device 10 may be prevented from being accidentally unlocked.

In an embodiment, the operation environment information may reflect the screen state of the electronic device 10. For example, the processor 15 may detect the screen state of the electronic device 10 through the sensor 12. For example, the screen state may reflect whether the screen of the display 16 is currently turned on or off. When the screen is turned on, the screen of the display 16 displays an image. When the screen is turned off, the screen of display 16 does not display an image.

If (or in response to) the detected operation environment information reflects that the screen of the display 16 is currently turned on (for example, the sensor 12 detects that a signal on a specific signal line of the display 16 is pulled up), the processor 15 may judge that the operation environment information meets the default condition. However, if (or in response to) the detected operation environment information reflects that the screen of the display 16 is currently turned off (for example, the sensor 12 detects that the signal on the specific signal line of the display 16 is not pulled up), the processor 15 may judge that the operation environment information does not meet the default condition. It should be noted that how to detect the screen state of the electronic device 10 through the sensor 12 implemented by hardware, software, or firmware is a common technical means in the technical field, so details are not repeated here.

In an embodiment, in the locked state of the electronic device 10, if the detected operation environment information reflects that the screen of the display 16 is currently turned on (for example, the user presses the power button to light up the screen of the display 16 to present the screen lock image or an unlock image), it means that the user really intend to operate the electronic device 10 at this time. At this time, it is reasonable to proceed to unlock the electronic device 10 according to Step S208 in FIG. 2. However, in certain cases, if the detected operation environment information reflects that the screen of the display 16 is currently turned off, it means that the user does not intend to operate the electronic device 10 currently. At this time, in Step S205 of FIG. 2, the processor 15 prohibits unlocking the electronic device 10, which may also prevent the electronic device 10 from being accidentally unlocked.

It should be noted that in an embodiment, compared with the authentication of the fingerprint information after Step S204 in FIG. 2 (that is, judging that the operation environment information meets the default condition), the fingerprint information is authenticated first in Step S202, which can improve the speed of unlocking the electronic device 10 after judging that the operation environment information meets the default condition.

In summary, after detecting the fingerprint information of the user through the first sensor (for example, the fingerprint sensor) of the electronic device, the fingerprint information may be authenticated immediately (for example, by comparing with the fingerprint patterns of the registered fingerprint in the database), and the authentication result of the fingerprint information may be temporarily stored. Then, in response to the operation environment information detected by the second sensor meeting the default condition, the electronic device may quickly unlock according to the authentication result stored in advance. On the other hand, if the detected operation environment information does not meet the default condition, no matter whether the temporarily stored fingerprint information passes authentication, the electronic device will not be unlocked. In this way, the reliability of unlocking the electronic device can be effectively improved on the premise of not increasing operation delay as much as possible.

What is claimed is:

1. A device unlocking method for an electronic device, wherein the electronic device comprises a first sensor and a second sensor, the device unlocking method comprising:
   detecting fingerprint information of a user by the first sensor;
   authenticating the fingerprint information and temporarily storing an authentication result of the fingerprint information;
   after authenticating the fingerprint information, detecting operation environment information related to the electronic device by the second sensor, wherein the operation environment information reflects a screen state of the electronic device;
   in response to the operation environment information meeting a default condition, unlocking the electronic device according to the authentication result; and
   in response to the operation environment information not meeting the default condition, prohibiting unlocking the electronic device, wherein the operation environment information reflects a screen state of the electronic device, in response to the operation environment information reflects that a screen of the electronic device is currently turned off, determining the operation environment information does not meet the default condition, prohibiting unlocking the electronic device.

2. The device unlocking method according to claim 1, wherein the operation environment information reflects a distance between the electronic device and an external object.

3. The device unlocking method according to claim 2, further comprising:
   in response to the distance between the electronic device and the external object being greater than a threshold value or a screen of the electronic device being in an activated state, judging that the operation environment information meets the default condition.

4. The device unlocking method according to claim 1, wherein the step of in response to the operation environment information meeting the default condition, unlocking the electronic device according to the authentication result comprises:
   in response to the operation environment information meeting the default condition, reading the authentication result of the fingerprint information from a buffer memory;
   in response to the authentication result reflecting the fingerprint information passing authentication, unlocking the electronic device; and
   in response to the authentication result reflecting the fingerprint information not passing authentication, not unlocking the electronic device.

5. An electronic device, comprising:
   a first sensor;
   a second sensor;
   a buffer memory; and
   a processor, coupled to the first sensor, the second sensor, and the buffer memory,
   wherein the processor is used to:
   detect fingerprint information of a user by the first sensor;
   authenticate the fingerprint information and temporarily store an authentication result of the fingerprint information in the buffer memory;
   after authenticating the fingerprint information, detect operation environment information related to the electronic device by the second sensor;
   in response to the operation environment information meeting a default condition, unlock the electronic device according to the authentication result; and
   in response to the operation environment information not meeting the default condition, prohibit unlocking the electronic device, wherein the operation environment information reflects a screen state of the electronic device, in response to the operation environment information reflects that a screen of the electronic device is currently turned off, determine the operation environment information does not meet the default condition, prohibit unlocking the electronic device.

6. The electronic device according to claim 5, wherein the operation environment information reflects a distance between the electronic device and an external object.

7. The electronic device according to claim 6, wherein the processor is further used to:
   in response to the distance between the electronic device and the external object being greater than a threshold value or a screen of the electronic device being in an activated state, judge that the operation environment information meets the default condition.

8. The electronic device according to claim 5, wherein the operation of in response to the operation environment information meeting the default condition, the processor unlocking the electronic device according to the authentication result comprises:
   in response to the operation environment information meeting the default condition, reading the authentication result of the fingerprint information from the buffer memory;
   in response to the authentication result reflecting the fingerprint information passing authentication, unlocking the electronic device; and
   in response to the authentication result reflecting the fingerprint information not passing authentication, not unlocking the electronic device.

9. A device unlocking method for an electronic device, wherein the electronic device comprises a first sensor and a second sensor, the device unlocking method comprising:
   detecting fingerprint information of a user by the first sensor;
   authenticating the fingerprint information and temporarily storing an authentication result of the fingerprint information;
   after authenticating the fingerprint information, detecting operation environment information related to the electronic device by the second sensor; and
   in response to the operation environment information meeting a default condition, unlocking the electronic device according to the authentication result, wherein the operation environment information reflects a screen state of the electronic device, in response to the operation environment information reflects that a screen of the electronic device is currently turned on, determining the operation environment information meets the default condition, unlocking the electronic device.

* * * * *